(12) United States Patent (10) Patent No.: US 7,701,857 B2
Hikspoors et al. (45) Date of Patent: Apr. 20, 2010

(54) METHOD, SYSTEM, AND COMPUTER-READABLE MEDIUM FOR RESOURCE-BASED ROUTE SELECTION

(75) Inventors: Hank P. Hikspoors, McKinney, TX (US); Bill J. Hall, Plano, TX (US); Chen Cao, Lewisville, TX (US); San-qui Li, Plano, TX (US)

(73) Assignee: Genband Inc., Plano, TX (US)

( * ) Notice: Subject to any disclaimer, the term of this patent is extended or adjusted under 35 U.S.C. 154(b) by 721 days.

(21) Appl. No.: 11/448,999

(22) Filed: Jun. 7, 2006

(65) Prior Publication Data

US 2007/0286082 A1 Dec. 13, 2007

(51) Int. Cl.
*H04J 1/16* (2006.01)
(52) U.S. Cl. .................................. 370/238; 709/241
(58) Field of Classification Search .............. 370/230.1, 370/235, 237, 238, 254, 256; 709/241
See application file for complete search history.

(56) References Cited

U.S. PATENT DOCUMENTS

| 5,317,566 | A | 5/1994 | Joshi |
| 6,301,244 | B1 | 10/2001 | Huang et al. |
| 6,487,172 | B1 * | 11/2002 | Zonoun .................... 370/238 |
| 6,606,303 | B1 * | 8/2003 | Hassel et al. ............... 370/238 |
| 6,697,335 | B1 | 2/2004 | Ergun et al. |
| 6,831,898 | B1 * | 12/2004 | Edsall et al. ............... 370/256 |
| 2003/0193898 | A1 * | 10/2003 | Wong et al. ................ 370/252 |
| 2005/0195815 | A1 * | 9/2005 | Chaudhuri ................. 370/389 |

FOREIGN PATENT DOCUMENTS

| EP | 0 897 253 A2 | 2/1999 |
| WO | WO 99/33232 | 7/1999 |

OTHER PUBLICATIONS

Notification of Transmittal of the International Search Report and the Written Opinion of the International Searching Authority, or the Declaration for International Application No. PCT/US2007/070596 (Dec. 28, 2007).

* cited by examiner

*Primary Examiner*—Jason E Mattis
*Assistant Examiner*—Dady Chery
(74) *Attorney, Agent, or Firm*—Jenkins, Wilson, Taylor & Hunt, P.A.

(57) ABSTRACT

A method, system, and computer-readable medium for selecting a route in a network are provided. A respective link cost is assigned to links of a plurality of routes, and a respective node cost is assigned to nodes of the plurality of routes. A respective link cost is calculated for each of the links, and a respective node cost is calculated for each of the nodes. A respective route cost for each of the plurality of routes is calculated based on the calculated link cost for each of the links and the calculated node cost for each of the nodes.

20 Claims, 8 Drawing Sheets

US 7,701,857 B2

METHOD, SYSTEM, AND COMPUTER-READABLE MEDIUM FOR RESOURCE-BASED ROUTE SELECTION

BACKGROUND

Converged networks may include constituent networks of various types. For example, a converged network may include a wireline network, such as the public switched telephone network (PSTN), wireless networks, such as a network compliant with the Global System for Mobile Communications (GSM) network standards, the Universal Mobile Telecommunications System (UMTS) network standards, or other wireless networks, packet networks, such as the Internet, and/or other network infrastructure. Conventional call routing mechanisms may, and often do, route a call through a plurality of network types.

Link cost-based routing algorithms are suitable for evaluating routes across homogenous network types where data travels in the same format from a call originator to a call terminator with no variation in the format. However, when media conversions for transmission of a call across heterogeneous nodes are involved, a link cost-based evaluation provides for no consideration of cost incurred for requisite media conversion. Simple link cost-based routing mechanisms may select routes that introduce large processing overhead, such as media translations, when other more desirable routes may be available. Disadvantageously, latency, quality loss, and other undesirable effects may be incurred by selecting a call route in a converged network on a link cost-basis.

BRIEF DESCRIPTION OF THE DRAWINGS

Aspects of the present disclosure are best understood from the following detailed description when read with the accompanying figures, in which.

DETAILED DESCRIPTION

Figure 1:
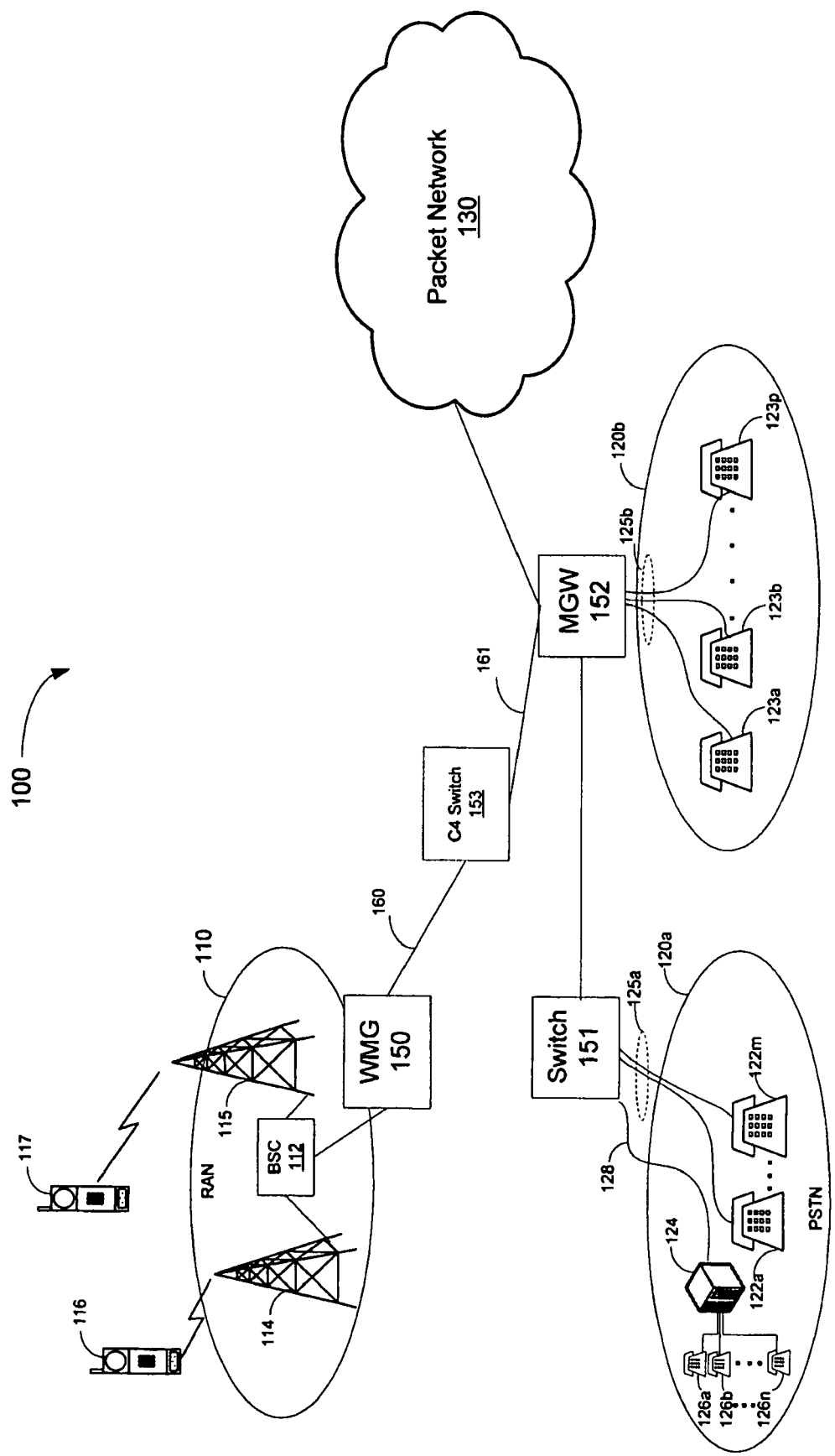
FIG. 1 is a diagrammatic representation of an embodiment of an exemplary converged network comprising wireless, wireline, and packet networks.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagrammatic representation of an embodiment of an exemplary converged network 100 comprising wireless, wireline, e.g., PSTN, and packet networks. Network 100 may include several networks and/or portions of networks interconnected by various infrastructure. In the illustrative example, network 100 includes a radio access network 110, public switched telephone network (PSTN) access networks 120a-120b, and a packet network 130.

Radio access network (RAN) 110 may include a base station controller (BSC) 112 that is coupled with one or more base transceiver stations (BTSs) 114-115 that provide an over-the-air interface with one or more wireless mobile terminals 116-117. BTSs 114-115 include equipment for transmitting and receiving radio signals with mobile terminals 116-117. BTSs 116-117 may be adapted to encrypt and decrypt communications made with BSC 112 which may provide control to a plurality of BTSs. In the illustrative example, BSC 110 interfaces with a switching wireless media gateway (WMG) 150 that provides for communications between devices in RAN 110 with other access networks, such as PSTN access networks 120a-120b and packet network 130. RAN 110 and WMG 150 may comprise part of a cellular or mobile telecommunications network, such as a network compliant with the Global System for Mobile (GSM) Communications standards, Universal Mobile Telecommunications System (UMTS), or another mobile or cellular radio system.

PSTN access network 120a may include various devices, such as residential telephones 122a-122m, and/or one or more private branch exchanges (PBXs) 124. PBX 124 may connect with switch 151 via one or more trunk lines 128. Various devices 126a-126n, such as telephones, communication terminals, facsimile machines, and the like, may be connected with PBX 124. Residential telephones 122a-122m may be coupled with switch 151, such as a class 5 switch, that may be deployed as a central office by local loops 125a. In other implementations, telephones 122a-122m may be coupled with switch 151 by digital loop carriers, PBXs, digital concentrators, and/or other aggregators, or may otherwise be configured to communicate with switch 151 through PSTN access network 120a. Loops 125a may include digital loops and/or analog loops, and may be configured to transmit time-division multiplexed (TDM) and other PSTN data, among others. Loops 125a may comprise, for example, a respective twisted copper pair terminating telephones 122a-122m.

In a similar manner, PSTN access network 120b may include a variety of communication devices 123a-123p that may be interconnected with a switching media gateway (MGW) 152 via local loops 125b or other suitable couplings. In this implementation, media gateway 152 may provide switching services and media handling across various platforms. Accordingly, MGW 152 may interface with one or more network types, such as PSTN access network 120b and packet network 130. In other implementations, MGW 152 may interface with a RAN and thus may include one or more wireless network interfaces. Moreover, MGW 152 may provide both Class 4 and Class 5 switching services and thus may aggregate traffic from other network entities, such as switch 151 interconnected therewith, and may provide switching services to termination points in networks 120b and 130.

Packet network 130, such as the Internet or another packet switching network, may include interconnected computer networks, data processing systems, communication devices, packet switching infrastructure, and the like. Packet network 130 may interface with one or more switches, such as switching MGW 152. In the illustrative example, MGW 152 interfaces with PSTN access network 120b and packet network 130, and thus may include both TDM switching and packet switching capabilities.

Switch 153 may aggregate traffic from any number of telecommunication nodes, such as MGWs 150 and 152 connected therewith via respective trunks 160 and 161, other network switches, and the like, and thus may be implemented as a Class 4 switch. Accordingly, any device in RAN 110, PSTN access networks 120a and 120b, and packet network 130 may communicate with any other device in RAN 110, PSTN access networks 120a and 120b, and packet network 130.

Conventional communications may traverse any one or more of wireless networks, such as RAN 110, wireline networks, such as PSTN access networks 120a-120b, and packet networks, such as packet network 130, and it is not uncommon for a call to traverse all three types of networks. In accordance with embodiments disclosed herein, mechanisms for determining an optimal call route in a converged network, such as that depicted in FIG. 1, are provided.

Figure 2:
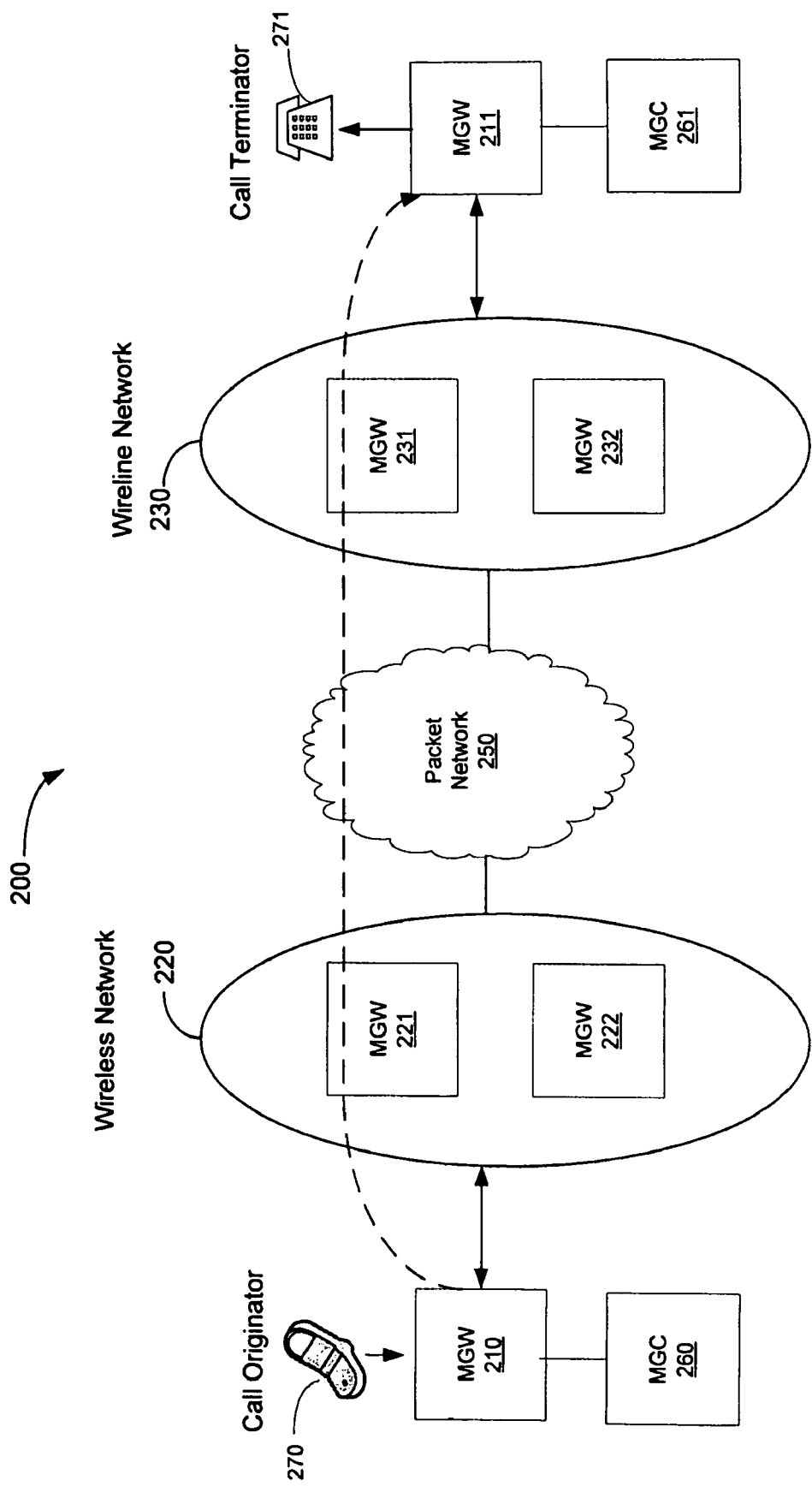
FIG. 2 is a diagrammatic representation of at least a portion of a converged network in which a call may be routed from a call originator to a call terminator.

FIG. 2 is a diagrammatic representation of at least a portion of a converged network 200 in which a call may be routed from a call originator, or calling party, to a call terminator, or called party. Exemplary converged network 200 includes a wireless network 220, a wireline network 230, and a packet network 250. Wireless network 220 may include various infrastructure, such as media gateways 221 and 222, wireline network 230 may include various network infrastructure such as media gateways 231 and 232, and packet network 250 may include various packet-compliant entities. The particular depiction of the various networks in converged network 200 is provided to facilitate an understanding of embodiments disclosed herein, and it is understood that each of wireless network 220, wireline network 230 and packet network 250 receptively comprise complex networks with potentially vast deployments of a variety of networking equipment. The particular entities shown in the depicted network 200 are provided only to facilitate and understanding of embodiments disclosed herein.

A conventional call may be conveyed through one or more of networks 220, 230, and 250. A media gateway controller (MGC) 260 may be connected with a media gateway 210 that provides switching and call processing to call originator 270. Media gateway controller 260 may be interconnected with a plurality of media gateways for control thereof, and depiction of media gateway controller 260 interconnected with a single media gateway 210 is provided to simplify the illustration. Media gateway controller 260 may be physically and logically separated from media gateway 210. Media gateway controller 260 and media gateway 210 may provide softswitch functionality. For example, media gateway controller 260 may provide call routing, signaling, and various other call services, while media gateway 210 provides for media conversion, formatting, switching, and other services for creating an end-to-end path for call media. Media gateway 210 may include one or more wireless interfaces for connecting with one or more nodes, such as media gateway 221 and 222, of wireless network 220. One or more nodes of wireless network 220 may be adapted for communicating with packet network 250 infrastructure. In a similar manner, one or more nodes of packet network 250 may be adapted for communicating with one or more nodes, such as media gateways 231 and 232, of wireline network 230. Wireline call terminator 271 is terminated with a media gateway 211, or other switching device, via a local loop or other suitable communication medium. Media gateway 211 may be connected with and controlled by a media gateway controller 261.

In the present example, assume a wireless call is placed by call originator 270 implemented as a mobile terminal or other wireless network terminal device. The call is carried over an air interface from call originator 270 via one or more base transceiver stations (not shown), and is conveyed therefrom to media gateway 210. In the present example, media gateway 210 is interconnected with a wireless network 220 that is, in turn, interconnected with a wireline network 230, such as the PSTN, via a packet network 250. Thus, a call originated by call originator 270 may be routed to call terminator 271 via media gateway 210 and 221, packet network 250, media gateway 231 of wireline network 230, and media gateway 211 included in or interfaced with wireline network 230.

In conventional network implementations, media gateway controller 260 interfaced with media gateway 210 that services call originator 270 may include softswitch functionality that performs routing decisions for determining an end-to-end route between call originator 270 and call terminator 271. In the illustrative example, media gateway controller 260 determines an end to end route of media gateways or other switching elements from the service area of media gateway controller 260 to the service area of MGC 261. In the present example, MGC 260 has selected a route (illustratively designated with dashed lines) that traverses MGW 210, MGW 221, packet network 250, and MGWs 231 and 211 although other routes, e.g., including routes traversing one or more of MGWs 222 and 232, may be selected by MGC 260 for connecting the call between call originator 270 and call terminator 271.

Figure 3:
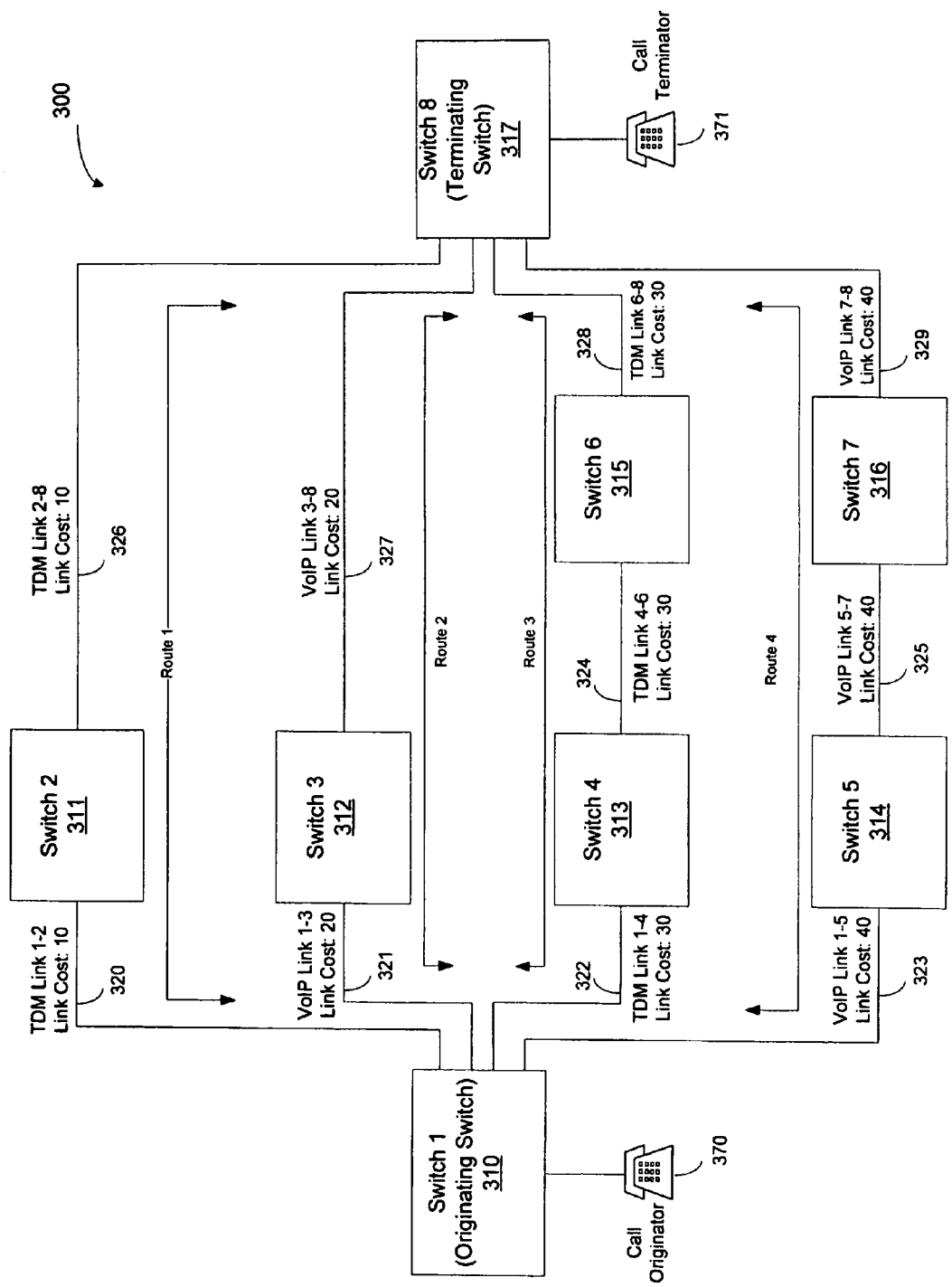
FIG. 3 is a diagrammatic representation of a network system comprising various switches disposed between a call originator and a call terminator in which a conventional shortest path algorithm may be implemented for determining an end-to-end call route.

A simple shortest path algorithm may be implemented in conventional softswitch functions for identifying a desirable route. A shortest path algorithm may select a route identified as having the shortest path based on link cost metrics. FIG. 3 is a diagrammatic representation of a network system 300 comprising various switches disposed between a call originator and a call terminator in which a conventional shortest path algorithm may be implemented for determining an end-to-end call route. Network system 300 includes various switches 310-317 (illustratively designated Switch 1-Switch 8) interconnected by links 320-329, such as trunk lines or other suitable communication links. Switches 310-317 may be implemented as, for example, Class 4 switches, Class 5 switches, switching media gateways, or other nodes capable of providing telecommunication switching services.

In the present example, assume a call originator 370 places a call to a call terminator 371. The configuration of network 300 depicted in FIG. 3 provides for four possible call routes (illustratively designated Route 1-Route 4) for connection of a call between call originator 370 and call terminator 371, namely: a first route traversing originating switch 310, switch 311, and switch 317; a second route traversing originating switch 310, switch 312, and switch 317; a third route traversing originating switch 310, switch 313, switch 315, and switch 317; and a fourth route traversing originating switch 310, switch 314, switch 316, and switch 317. As referred to herein, a route comprises a path between two nodes that may include one or more nodes disposed therebetween and one or more constituent route segments or legs that respectively include a communication link. In the present example, the first route between call originator 370 and call terminator 371 includes time division multiple (TDM) links 320 and 326. In a similar manner, the second route includes VoIP links 321 and 327. Likewise, the third route includes TDM links 322, 324, and 328, and the fourth route includes VoIP links 323, 325, and 329. In FIG. 3, each link is illustratively designated as Link X-Y, where X designates the ingress switch of the link with respect to call data flow from call originator 370 to call terminator 371, and Y designates the egress switch of the link with respect to call data flow from call originator 370 to call terminator 371. Thus, for example, the route segment over link 320 from Switch 1 to Switch 2 is illustratively designated Link 1-2.

Switches 310-317 may provide switching services for various network types. In the present example, originating switch 310 and terminating switch 317 each include time division multiplex (TDM) interfaces for communicating over TDM networks, such as PSTN T-Carrier, SONET, or other wireline or PSTN links, and VoIP interfaces for communicating over packet network links. Switches 311, 313, and 315 include TDM interfaces, and switches 312, 314, and 316 include packet interfaces for communicating packet data, such as VoIP data, over a packet network.

Link costs may be calculated or otherwise determined for each of links 320-329. A link cost comprises a metric that may account for link characteristics, such as link distance, link type, expenditures in deployment of a link, maintenance expenditures, quality of service, bandwidth, and the like, and provides a mechanism for relative measurements among various links. In the example of FIG. 3, each link 320-329 is assigned a respective link cost of 10, 20, 30, or 40. Conventional link cost-based algorithms sum constituent link costs of routes for determining a cost-optimal route. Thus, Routes 1-4 have respective link costs of 20, 40, 90, and 120, and Route 1 may be selected as an optimal route for a call based on a link cost evaluation.

Link cost based routing algorithms are suitable for evaluating routes that traverse homogenous network nodes where data travels in the same format from an originating node to a terminating node with no variation in the format. However, when media conversions for transmission of a call across heterogeneous nodes are involved, a link cost based evaluation provides for no consideration of the impact of requisite media conversions. For example, assume that call originator 370 and call terminator 371 depicted in FIG. 3 are both VoIP terminals, and that the call is transmitted along Route 1 based on a link cost evaluation of the available routes. In this scenario, a codec translation is required at each of switches 310 and 317 because switch 311 is not adapted for receipt or transmission of packet data. The codec translations introduce a node "cost", such as processing overhead that may introduce additional latency, voice quality degradation, digital signal processor (DSP) consumption, or other effects that are unaccounted for by conventional link cost-based routing algorithms.

Embodiments disclosed herein provide for mechanisms that account for various forms of processing involved at nodes of routes in a converged network in addition to link costs. Particularly, a node cost may be associated with service-impacting factors, such as transcoding, codec translation, and resource usage, and route selection may be more efficiently made to route a call across a converged network. The node cost provides a mechanism to account for resources at a switch that are specific to a particular type of network. For example, a node cost may account for a quality of service impact on a 3G UMTS network that includes a factor for whether transcoder free operation (TrFO) and tandem free operation (TFO) are available at a media gateway.

In accordance with an embodiment a link cost is assigned to network links, and a node cost is assigned to network nodes. The link cost may be assigned by an operator based on well-established criteria, such as link distance, type of link, and other operator-chosen criteria. The node cost may be assigned by an operator based on, for example, the presence or absence of particular node resources that may either negatively or positively impact service quality and resource usage, and/or other operator-chosen criteria. The node resources may comprise digital signal processor (DSP) resources on a media gateway that effect the service quality of a voice call or a multimedia call on a converged network.

In accordance with another embodiment, relative weights may be assigned to each type of resource. The weights assigned to resources may be based on operator criteria. The criteria may include, for example, requirements specified in a level of service agreement (LSA) the operator has agreed to with customers, type of services carried on the network, and/or other considerations. In one embodiment, a weight value may range from 0 to 1 with a weight of 0 indicating that there is no cost on a node or a link.

The accordance with another embodiment, a cost of an end-to-end route is calculated at a switch from which a call originates. The calculation may comprise several steps as described with reference to FIG. 4 which depicts a flowchart of an embodiment of a node-based routing algorithm. The node-based routing algorithm may be invoked (step 402), for example, after translating digits and determining an appropriate route identifier (ID) for a call. Link costs may be collected for each link along a route of interest (step 404), and link weights associated with the links may be applied to the link costs (step 406). Node costs for each node along the route may be collected (step 408), and node weights may then be applied thereto (step 410). A cost for the end-to-end route may then be calculated (step 412). For example, each weighted link cost and node cost along the route may be summed to calculate an aggregate route cost. An evaluation may then be made to determine if any additional routes remain for evaluation (step 414). In the event that an additional route remains for evaluation, the node-based routing routine may then return to step 404 to collect link costs of the route. When each route of interest has been evaluated according to steps 404-412, the node-based routing routine may eliminate any routes that do not meet operator requirements (step 416). For example, any number of requirement may be defined based on operator requirements, customer requirements, and the like, such as minimum codec/bearer capabilities. An optimal route may then be selected from the remaining routes based on the end-to-end route costs (step 418). The node-based routing algorithm cycle may then end (step 420).

Figure 5:
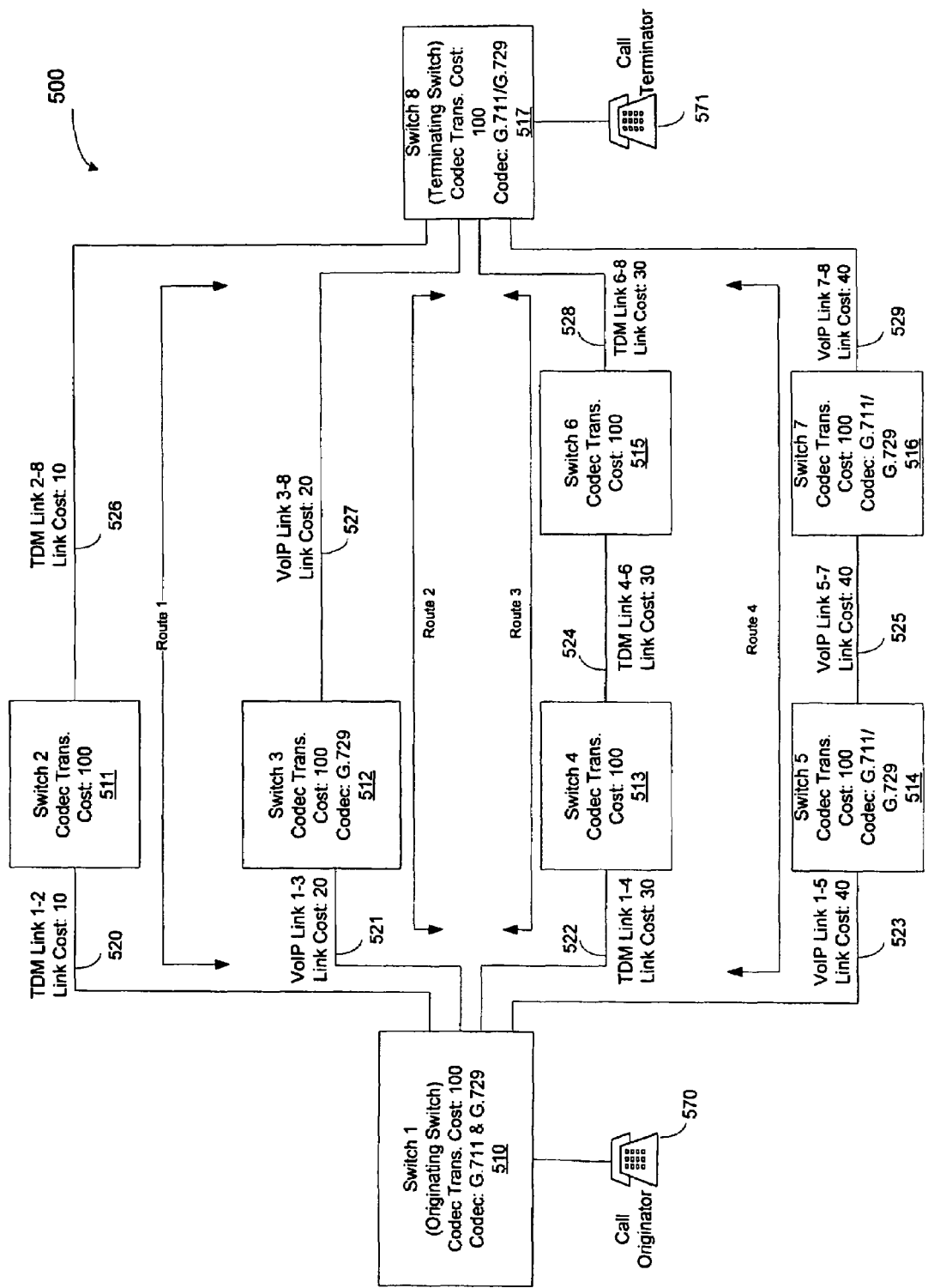
FIG. 5 is a diagrammatic representation of network system comprising various switches disposed between a call originator and a call terminator in which a node-based routing algorithm may be implemented for determining an optimal end-to-end call route in accordance with embodiments disclosed herein.

FIG. 5 is a diagrammatic representation of network system 500 comprising various switches disposed between a call originator 570 and a call terminator 571 in which a node-based routing algorithm may be implemented for determining an optimal end-to-end call route in accordance with embodiments disclosed herein. Network system 500 includes various switches 510-517 (illustratively designated Switch 1-Switch 8) interconnected by links 520-529, such as trunk lines or other suitable communication links. Switches 510-517 may be implemented as, for example, Class 4 switches, Class 5 switches, switching media gateways, or other nodes capable of providing telecommunication switching services and/or media conversion services.

In the present example, VoIP codec processing is factored into node cost calculations. The configuration of network 500 depicted in FIG. 5 provides for four possible routes (illustratively designated Route 1-Route 4) for connection of a call between call originator 570 and call terminator 571, namely: a first route traversing originating switch 510, switch 511, and switch 517; a second route traversing originating switch 510, switch 512, and switch 517; a third route traversing originating switch 510, switch 513, switch 515, and switch 517; and a fourth route traversing originating switch 510, switch 514, switch 516, and switch 517. In the present example, the first route includes TDM links 520 and 526, the second route includes VoIP links 521 and 527, the third route includes TDM links 522, 524, and 528, and the fourth route includes VoIP links 523, 525, and 529.

Switches 510-517 may provide for switching services for various network types. In the present example, originating switch 510 and terminating switch 517 each include TDM interfaces for communicating over TDM networks, and packet interfaces for communicating VoIP data over packet network links. Switches 511, 513, and 515 include TDM interfaces, and switches 512, 514, and 516 include packet interfaces for respectively communicating over TDM and IP links.

Link costs may be assigned for each of links 520-529. In the example of FIG. 5, each link 520-529 is assigned a respective link cost of 10, 20, 30, or 40. Additionally, node costs may be assigned to each of switches 510-517 in accordance with embodiments disclosed herein. In the present example, a codec translation cost of "100" is assigned to each of switches 510-517. By assigning a node cost comprising a codec translation cost or factor, a node processing impact may be considered in the route selection process. For purposes of illustration, link and node weights are assigned a weight factor or "1".

Various factors may be considered when determining a node cost for assignment to a node. In accordance with embodiments, effects of interworking and convergence between fixed and mobile networks, packet networks, such as IP networks, and wireline networks, such as PSTN networks may be considered when assigning a node cost. The cost assigned to a node may be based on the consideration of the interworking impact on the provided service. For example, a cost may be determined based on the impact to voice quality due to requisite processing for media translation. Thus, the node cost may be associated with DSP resources whose presence or absence may directly impact the quality of services. The node cost may also be associated with use of an expensive resource. Any number of factors may be considered, alone or in combination, for determining the node cost, and those described are exemplary only.

When assignment of node cost is expressed in terms of impact on service quality of calls, many factors may impact the quality of services. Exemplary factors may include additional signal processing steps, the absence/presence of a resource, and the like. When the presence of a resource at the node has a positive or otherwise desirable impact, a node cost of "0" may be assigned to the node in accordance with an embodiment. In other embodiments, costs may comprise signed, that is positive or negative, values. For example, a cost may be assigned negative values to indicate a positive service impact (assuming increasing positive route costs as indicating an increase in the undesirability of a route). The absence of a particular node resource may result in a negative impact on the quality of service and thus incur a positive-valued cost. For example, absence of transcoder free operation (TrFO) capabilities at a node may require codec translation at the node and thus degradation of service quality for wireless calls. Additional processing steps include the conversion from one data format to a different format that normally takes place at an interface between two different networks. One example is the conversion of data across UMA (Unlicensed Mobile Access) access network and a UMTS network.

In accordance with embodiments disclosed herein, node cost considerations may include, but are not limited to, any of the following: codecs for VoIP calls, TrFO capabilities, tandem free operation (TFO) capabilities, voice quality enhancement (VQE) capabilities, UPFP/Iu-CS, and UMA NB-IP.

Various codec requirements for VoIP calls may be considered when determining a node cost. A determination of whether codecs between two legs of a call are the same, and whether a codec translation is required may be considered when assigning a node cost. For example, a codec translation may negatively impact the service quality and thus may contribute to the overall node cost.

For wireless calls, TrFO capabilities, or the lack thereof, may be considered when assigning a node cost. If incoming and outgoing legs of a wireless call are commonly formatted, and no codec translation is required, no node cost may be assigned based on TrFO (or a negative node cost may be applied to account for the desirable impact of the node capabilities). The absence of TrFO may negatively impact service quality, and the node cost may be accordingly adjusted to indicate the lack of TrFO.

TFO allows for bypassing the encoding process at an intermediate node, such as a tandem media gateway for mobile to mobile calls or mobile to wireline phone call. The encoded voice data received from the originating end, such as a BTS, is not decoded at an intermediate node, such as a Selection Distribution Unit (SDU). Instead, the encoded voice is transmitted transparently through the network. The encoded speech is routed to the last point in the network where it is converted back to the appropriate signaling format for routing to the terminating end. The lack of TFO capabilities at a node may negatively impact service quality due to encoding/decoding steps, and the node cost may be suitably adjusted.

The availability, or the lack thereof, of VQE service capabilities may be considered in the node cost. VQE may encompass various algorithms implemented, for example, in a DSP in a manner than enhances speech quality. VQE may include echo cancellation, noise reduction automatic level control, and/or other algorithms that may improve the voice quality of a call. Echo cancellation may be implemented to reduce echo components from speech signals. Noise reduction may be implemented to reduce background noise under conditions where it exists. Automatic level control may be implemented to introduce an appropriate amount of gain or loss in order to create an output speech signal with a signal level appropriate for desirable perceived speech quality. The node cost may be adjusted to reflect the presence or absence of VQE.

Other capabilities that may be considering when assigning a node cost may include circuit-switched Iu interface between a Radio Access Network (RAN) and a core network (UPFP/Iu-CS), unlicensed mobile access capabilities, such as a DSP resource that converts data in a UMA format to a UMTS or other 3G wireless data format, and network bearer-IP, an IP based interface between wireless media gateways (NB-IP).

In the example of FIG. 5, route 1 would be identified as the optimal route based on link cost alone. However, considering node costs, different optimal routes may be identified based on characteristics of the call. For example, consider the following two call scenarios: a TDM-originated call to a TDM-terminated call, and a VoIP-originated call to a VoIP-terminated call. In the example of a TDM-originated to a TDM-terminated call, Route 1 may be identified as the optimal route as no codec cost is introduced at any of the Route 1 switches, and only two link costs of "10" are incurred along route 1. Thus, the route cost of Route 1 is lower than any of the other available routes.

In the case of a VoIP-originated to VoIP-terminated call, assume the call is originated and terminated in G.729. Route costs may be calculated according to the following:

$$\text{Route Cost} = \Sigma(\text{LinkCost} * \text{Weight}) + \Sigma(\text{Node Cost} * \text{Weight}) \quad \text{eq. 1:}$$

In the example depicted in FIG. 5, the node cost may be calculated as a codec translation cost. Thus, the route costs of the available routes for a VoIP-originated call to a VoIP-terminated call both formatted according to G.729 may be calculated as summarized in Table A:

TABLE A

| Route | Σ(Link Cost * Weight) | Σ(Node Cost * Weight) | Route Cost |
|---|---|---|---|
| Route 1 | (10 + 10) | (100 + 100) | 220 |
| Route 2 | (20 + 20) | 0 | 40 |
| Route 3 | (30 + 30 + 30) | (100 + 100) | 290 |
| Route 4 | (40 + 40 + 40) | 0 | 120 |

In the depicted example, a VoIP-originated call to a VoIP-terminated call transmitted over Route 1 would incur links costs of "10" for each of links 520 and 526 and a node cost of 100 for codec translations incurred at nodes 510 and 517. Thus, a route cost of "220" may be calculated for Route 1. The same call would incur link costs "20" for each of links 521 and 527 and a node cost of "0" for Route 2 as no codec translation is incurred at any of nodes 510, 512, and 517 as each of the nodes are G.729-capable. Thus, a route cost of "40" may be calculated for Route 2. In a similar manner, the VoIP-originated to VoIP-terminated call calculated for Route 3 would incur links costs of "30" for each of links 522, 524, and 528, and a node costs of "100" incurred at each of nodes 510 and 517. Thus, a route cost of "290" may be calculated for the VoIP-originated to VoIP-terminated call fro Route 3. A route cost of "120" may be calculated for Route 4 based on link costs of "40" incurred at each of links 523, 525, and 529, and a node cost of "0" for each of nodes 510, 514, 516, and 517 because each of the nodes of Route 4 are G.729-capable. Thus, in the depicted example, Route 2 may be identified as the optimal route based on link and nodes costs.

Figure 6:
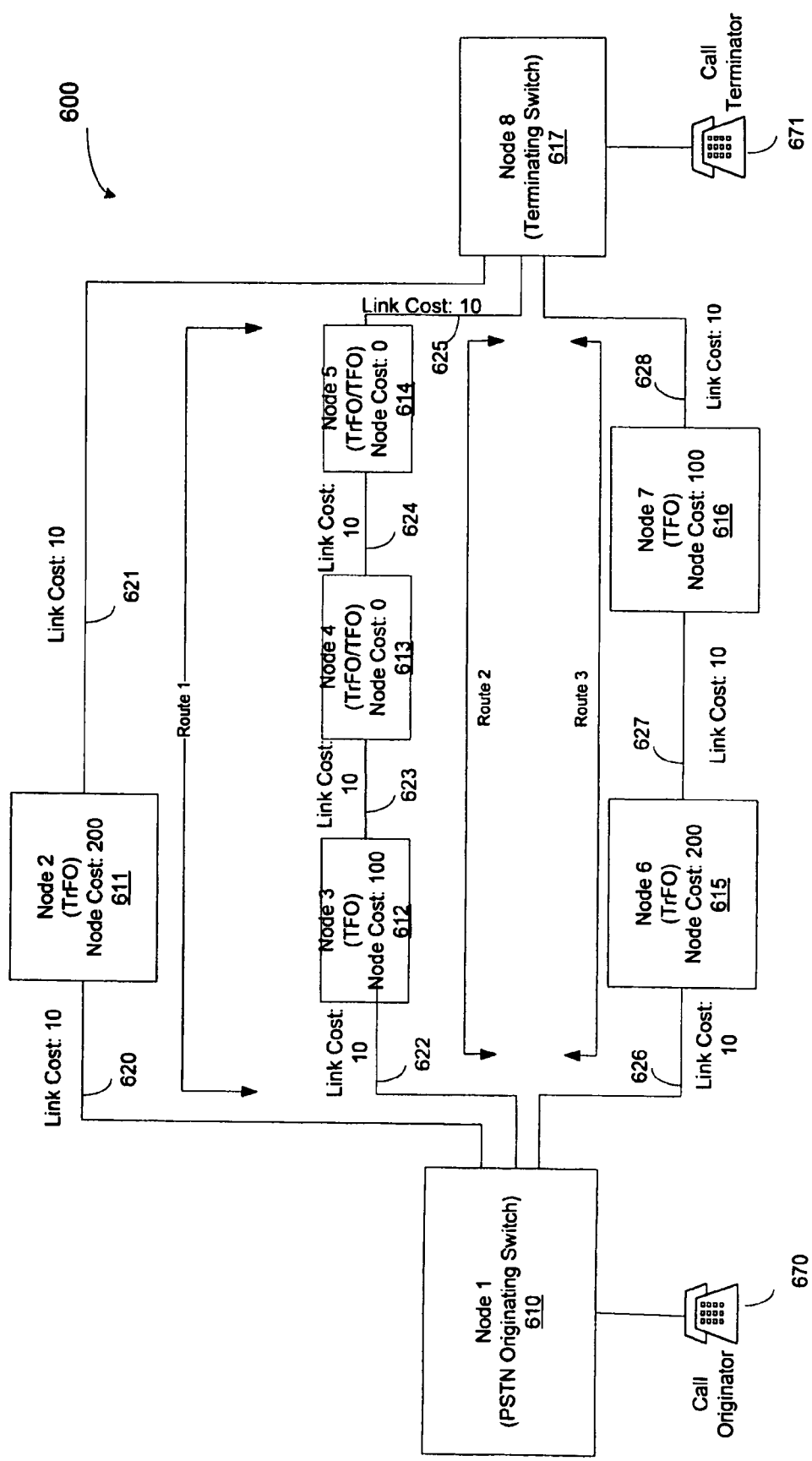
FIG. 6 is a diagrammatic representation of a network system comprising various nodes disposed between a call originator and a call terminator in which a node-based routing algorithm may be implemented for determining an optimal end-to-end call route in accordance with another embodiment.

FIG. 6 is a diagrammatic representation of a network system 600 comprising various nodes disposed between a call originator 670 and a call terminator 671 in which a node-based routing algorithm may be implemented for determining an optimal end-to-end call route in accordance with another embodiment. Network system 600 includes various nodes 610-617 (illustratively designated Node 1-Node 8) interconnected by links 620-628, such as trunk lines or other suitable communication links. Nodes 610-617 may be implemented as, for example, Class 4 switches, Class 5 switches, switching media gateways, or other nodes capable of providing telecommunication switching services and/or media conversion services.

In the present example, wireless TrFO and TFO are factored into node cost calculations. TrFO and TFO capabilities of nodes 610-617 are parenthetically indicated in FIG. 6. Particularly, each of nodes 613 and 614 each include TrFO and TFO capabilities, nodes 611 and 615 include TrFO capabilities but lack TFO capabilities, and nodes 612 and 616 include TFO capabilities but do not provide TrFO. For illustrative purposes, assume that the lack of TrFO capabilities is assigned a node cost of 100, and the lack of TFO capabilities is assigned a node cost of 200. Thus, nodes 613 and 614 are assigned a node cost of "0", nodes 612 and 616 are respectively assigned a node cost of "100", and nodes 611 and 615 are assigned respective node costs of "200." In accordance with conventional link cost based routing algorithms, Route 1 would be identified as the optimal route because it has a link cost of "20" incurred from links 620 and 621 while Routes 2 and 3 have link cost of "40" and "30", respectively. However, accounting for node costs in accordance with embodiments disclosed herein, Route 2 may be identified as the optimal route with a route cost of "140" compared to respective route costs of "220" and "330" for routes 1 and 3.

Figure 7:
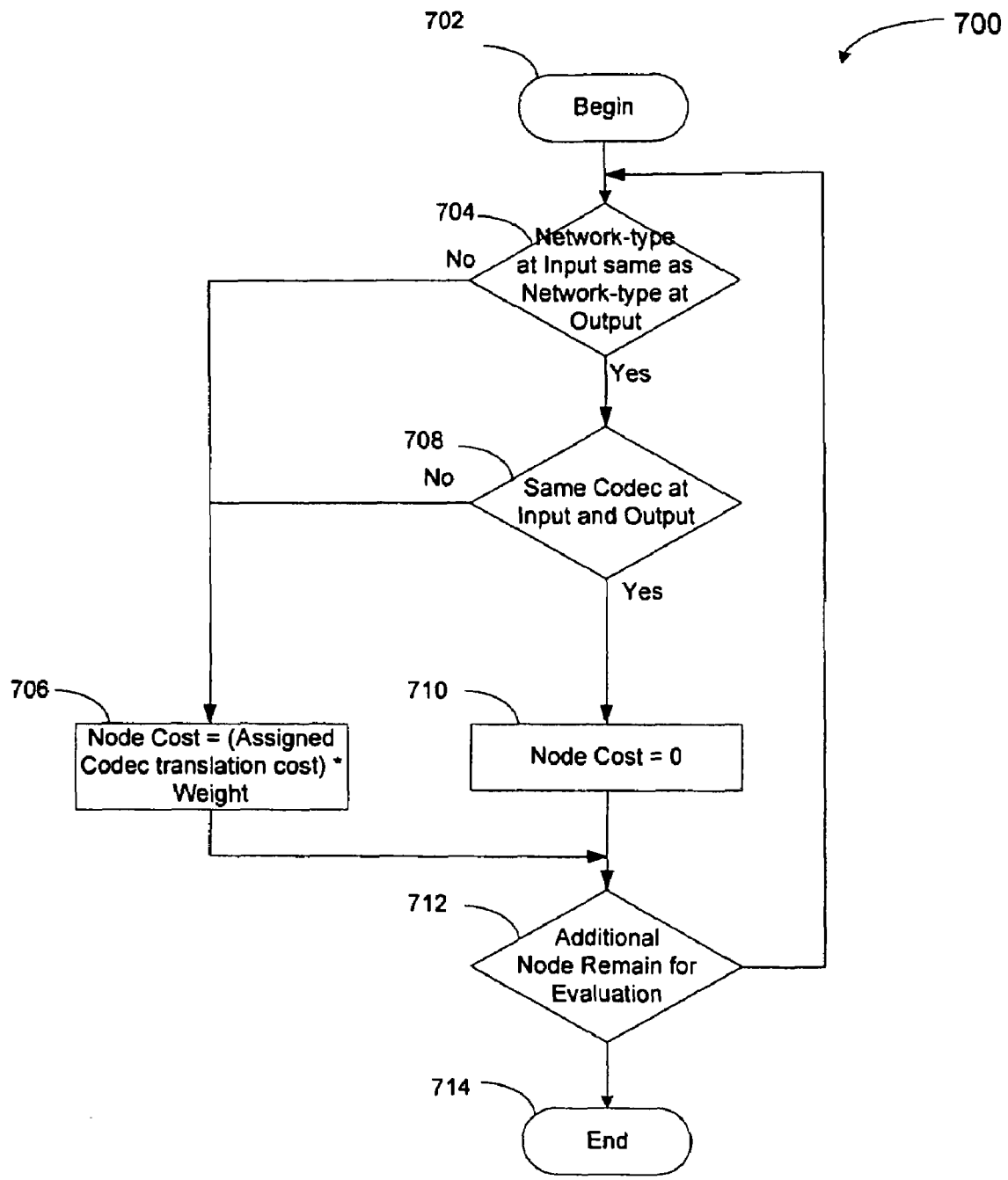
FIG. 7 is a flowchart depicting processing of an embodiment of a node cost algorithm for calculating a node cost based on codec translation.

FIG. 7 is a flowchart 700 depicting processing of an embodiment of a node cost algorithm for calculating a node cost based on codec translation. The node cost algorithm is invoked (step 702), and an evaluation may be made to determine if the network-type, e.g., PSTN, IP, wireless, of the media input is the same as the network-type of the media output (step 704). If the network-type of the input and output of the node are not the same, a codec translation is thus required, and a node cost may be assigned to the node as a product of the assigned codec translation cost and the weight (step 706). The node cost algorithm may then proceed to determine if other nodes remain for evaluation (step 712).

Returning again to step 704, in the event that the network-type of the input and output are the same, an evaluation may be made to determine if the same codec is to be applied at the node input and node output (step 708). In the event that different codecs are to be applied at the node input and node output, the node cost may be calculated as a product of the assigned codec translation cost and the weight according to step 706. For example, in the event that both the node input and output are identified as IP, different codecs, such as G.711 and G.729, may still be required for translation depending on the node's capabilities.

Returning again to step 708, in the event that the same codecs are applicable at the node input and node output, the node cost may be assigned "0" (step 710) as no codec processing is required at the node. The node cost algorithm may then proceed to evaluate whether an additional node remains for evaluation according to step 712. In the event that an additional node remains for evaluation, the node cost algorithm may return to step 704 to evaluate whether the network-type of the media input is the same as the network-type of the media output. When node costs have been calculated for all nodes, the node cost algorithm cycle may end (step 714).

Figure 8:
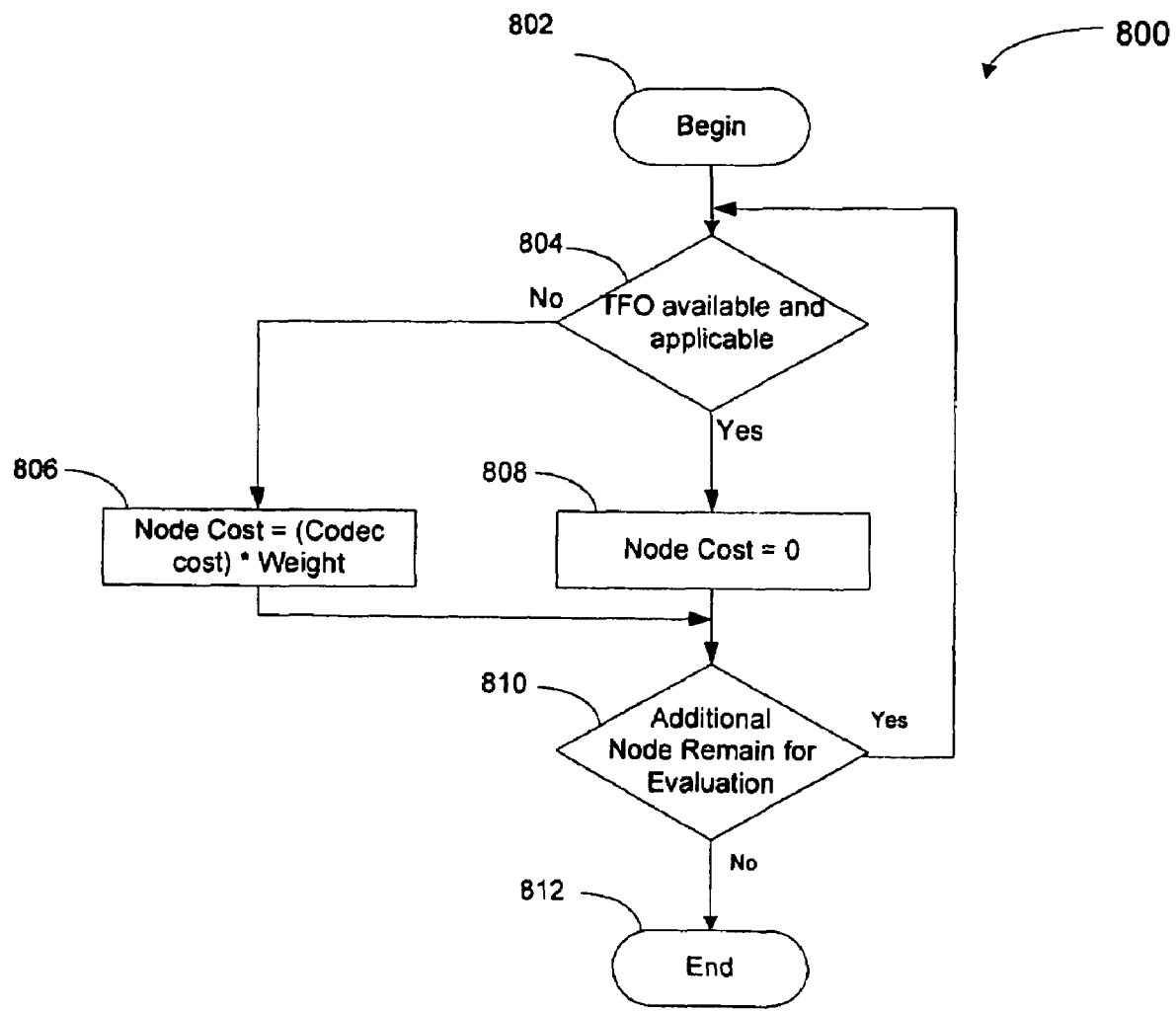
FIG. 8 is a flowchart depicting processing of an embodiment of a node cost algorithm for calculating a node cost based on tandem free operation availability and applicability.

FIG. 8 is a flowchart 800 depicting processing of an embodiment of a node cost algorithm for calculating a node cost based on TFO availability and applicability. Node cost for accounting for TrFO availability may be implemented in a similar manner as that described for TFO.

The node cost algorithm may be invoked (step 802), and an evaluation may be made to determine if TFO operation is available at the node and applicable for the call (step 804). In the event that TFO is not available or applicable, the node cost may be calculated as a product of the cost assigned to the required codec and the weight (step 806). The node cost algorithm may then proceed to evaluate whether any additional nodes remain for evaluation (step 810).

Returning again to step 804, in the event that TFO is available at the node and applicable, the node cost may be assigned a value of "0" as no codec translation is incurred at the node (step 808), and the node cost algorithm may proceed to determine whether any additional nodes remain for evaluation according to step 810. When all nodes have been evaluated, the node cost algorithm cycle may end (step 812).

As described herein, a system, method, and computer-readable medium for selecting an optimal route in a converged network are provided. Node costs are associated with service-impacting factors, such as transcoding, codec translation, and resource usage. A route cost may be calculated for each of a plurality of routes based on node costs assigned to nodes of each route. The node cost may be considered in conjunction with link costs assigned to links of the routes. Consideration of node costs provides for selection of an optimal route in a converged network that may include heterogeneous network infrastructure in which routes may have different processing overhead for routing a call between an originating node and a terminating node. Advantageously, calls may be efficiently routed across converged networks that may include wireline, wireless, and packet network entities.

The network examples depicted in FIGS. 1-3 and 5-6 are intended as examples, and not as an architectural limitations, of network systems in which embodiments disclosed herein may be implemented. Embodiments disclosed herein may be implemented in any network system comprising heterogeneous network entities.

Figure 4:
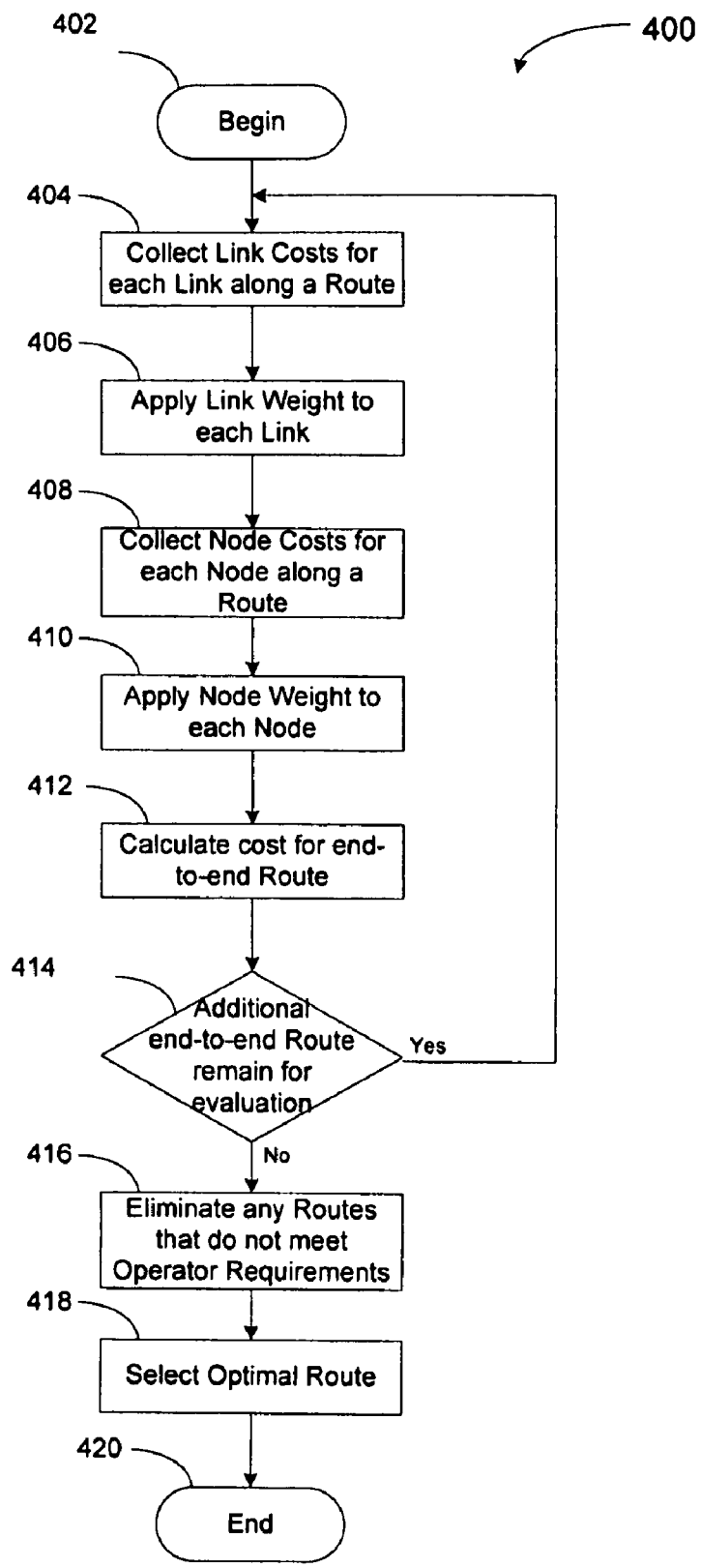
FIG. 4 is a flowchart of an embodiment of a node-based routing algorithm for determining an optimal route in a converged network.

The flowcharts of FIGS. 4 and 7-8 depict process serialization to facilitate an understanding of disclosed embodiments and are not necessarily indicative of the serialization of the operations being performed. In various embodiments, the processing steps described in FIGS. 4 and 7-8 may be performed in varying order, and one or more depicted steps may be performed in parallel with other steps. Additionally, execution of some processing steps of FIGS. 4 and 7-8 may be excluded without departing from embodiments disclosed herein. The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors or another instruction execution apparatus. Additionally, various steps of embodiments of the invention may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims.

What is claimed is:

1. A method of selecting a route on a network, comprising:
in a converged network that includes constituent networks of various types:
assigning a respective link cost to links of a plurality of routes;
assigning a respective node cost to nodes of the plurality of routes; and
calculating, for each route of the plurality of routes, a respective route cost based on the link cost of respective links included in the route and the node cost of respective nodes included in the route, wherein at least some of the routes span constituent networks of different types and wherein calculating the route costs includes calculating the costs for the routes that span the constituent networks of different types, wherein calculating the route costs includes calculating the cost of a route that includes a time division multiplexed (TDM) signaling link and an Internet protocol (IP) signaling link, wherein route cost=Σ(link cost)+Σ(node cost)

and wherein a link comprises a communications interconnection between nodes, a node comprises a hardware device for providing telecommunications switching services and/or media conversion services, the link cost includes a metric accounting for link characteristics, and the node cost includes a metric accounting for processing performed by a node associated with service-impacting factors.

2. The method of claim 1, further comprising:
assigning a weight to each respective link cost; and
assigning a weight to each respective node cost.

3. The method of claim 2, wherein assigning a weight to each respective link cost further comprises assigning a weight to each respective link cost based on operator-defined criteria, and wherein assigning a weight to each respective node cost further comprises assigning a weight to each respective node cost based on operator-defined criteria.

4. The method of claim 3, wherein the operator-defined criteria comprises one or more of a link distance, quality of service, traffic type, and service level agreement.

5. The method of claim 1, further comprising selecting a route from the plurality of routes based on the respective route cost.

6. The method of claim 1, wherein one or more of the plurality of routes includes heterogeneous network nodes.

7. The method of claim 6, wherein the heterogeneous network nodes each respectively comprise one of a wireline network node, a packet network node, and a wireless network node.

8. The method of claim 1, wherein assigning a respective node cost to the nodes comprises assigning a value to a node cost for each of the nodes, wherein the value is dependant on whether codec translation is required by the nodes.

9. The method of claim 1, wherein assigning a respective node cost to the nodes comprises assigning a value to a node cost for each of the nodes, wherein the value is dependent on availability of at least one service at each of the nodes.

10. The method of claim 9, wherein the service comprises one or more of a transcoder free operation service, a tandem free operation service, a voice quality enhancement service, and a codec translation for voice over Internet protocol calls.

11. A system for selecting a route in a network, comprising:
an originating node to which a call originator may convey call data;
a terminating node adapted to communicatively couple with a call terminator; and
a plurality of routes interconnecting the originating node and the terminating node, wherein each route respectively comprises at least one link having a respective link cost assigned thereto and at least one node having a respective node cost assigned thereto, wherein a respective route cost is calculated, for each route of the plurality of routes, based on the link cost of respective links in the route and the node cost of respective nodes included in the route, wherein at least some of the routes span a converged network that includes constituent networks of various types and wherein at least some of the respective route costs are calculated for routes for the routes that span the constituent networks of different types, wherein the calculated route costs include a route cost that is calculated for a route that includes a time division multiplexed (TDM) signaling link and an Internet protocol (IP) signaling link, wherein route cost=Σ(link cost)+Σ(node cost)

and wherein a link comprises a communications interconnection between nodes, a node comprises a hardware device for providing telecommunications switching services and/or media conversion services, the link cost includes a metric accounting for link characteristics, and the node cost includes a metric accounting for processing performed by a node associated with service-impacting factors.

12. The system of claim 11, wherein a weight is assigned to each respective link cost, and wherein a weight is assigned to each respective node cost.

13. The system of claim 11, wherein a route is selected from the plurality of routes based on the respective route cost.

14. The system of claim 11, wherein the network comprises nodes each respectively comprising one of a wireline network node, a packet network node, and a wireless network node.

15. A computer-readable medium having computer-executable instructions for execution by a processing system, the computer-executable instructions for selecting a route in a network, comprising:
in a converged network that includes constituent networks of various types:
instructions that assign a respective link cost to links of a plurality of routes;
instructions that assign a respective node cost to nodes of the plurality of routes; and
instructions that calculate, for each route of the plurality of routes, a respective route cost based on the link cost of respective links included in the route and the node cost of respective nodes included in the route, wherein at least some of the routes span constituent networks of different types and wherein calculating the route costs includes calculating the costs for the routes that span the constituent networks of different types, wherein calculating the costs includes calculating the cost of a route that includes a time division multiplexed (TDM) signaling link and an Internet protocol (IP) signaling link, wherein route cost=Σ(link cost)+Σ(node cost)

and wherein a link comprises a communications interconnection between nodes, a node comprises a hardware device for providing telecommunications switching services and/or media conversion services, the link cost includes a metric accounting for link characteristics, and the node cost includes a metric accounting for processing performed by a node associated with service-impacting factors.

16. The computer-readable medium of claim 15, wherein the instructions that assign a respective node cost to the nodes comprise instructions that assign a respective value to a node cost for each of the nodes that is dependent on whether codec translation is required by the nodes.

17. The computer-readable medium of claim 15, wherein the instructions that assign a respective node cost to the nodes comprise instructions that assign a respective value to a node cost for each of the nodes that is dependent on availability of at least one service at the nodes.

18. The computer-readable medium of claim 17, wherein the at least one service comprises one or more of a transcoder free operation service, a tandem free operation service, a voice quality enhancement service, and a codec translation for voice over Internet protocol calls.

19. The computer-readable medium of claim 15, wherein the network comprises a converged network.

20. The computer-readable medium of claim 15, further comprising:
instructions that assign a weight to each respective link cost; and
instructions that assign a weight to each respective node cost.

* * * * *